Nov. 3, 1931.  G. MIDBOE  1,830,400
INCLOSED CHAIN DRIVE AND SUSPENSION THEREFOR
Filed Sept. 8, 1928  3 Sheets-Sheet 1
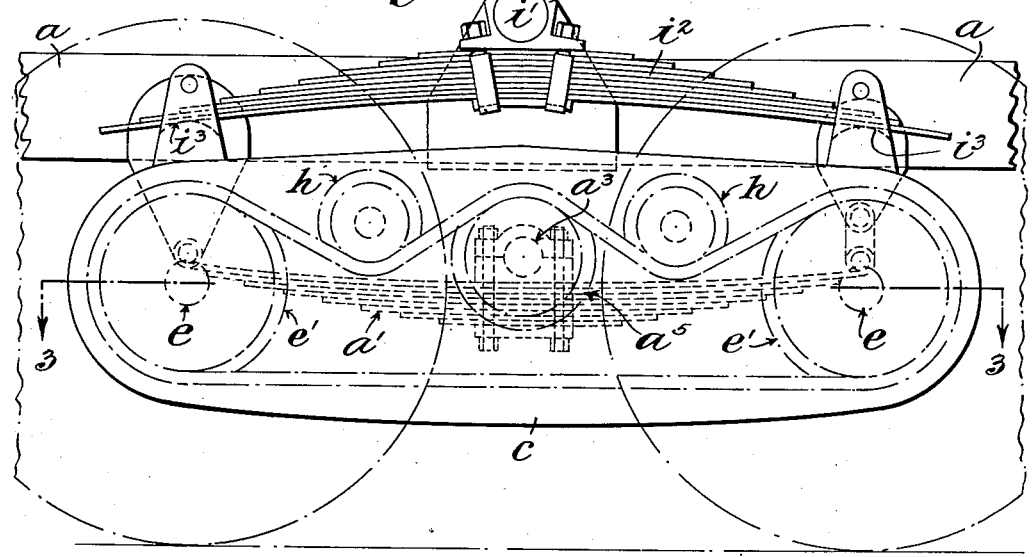
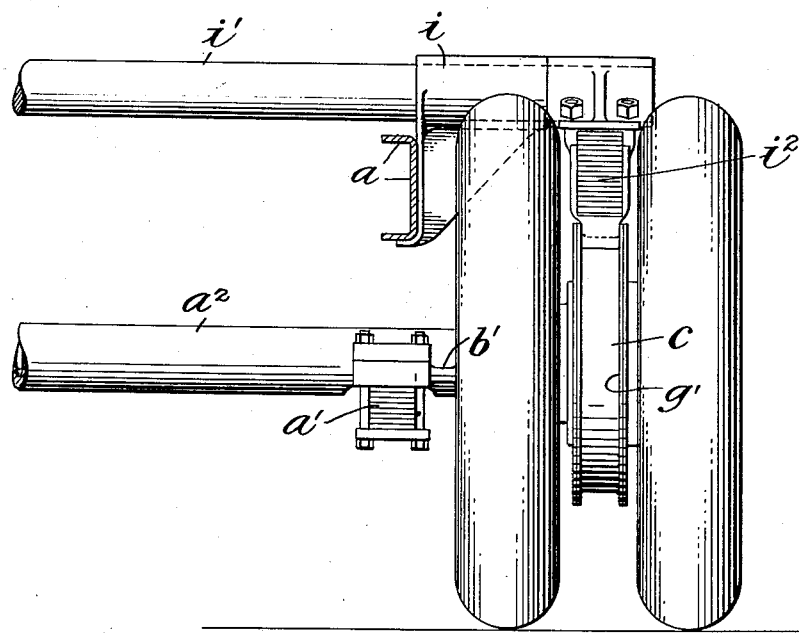
INVENTOR:
Gabriel Midboe
BY
his ATTORNEYS Nov. 3, 1931.   G. MIDBOE   1,830,400
INCLOSED CHAIN DRIVE AND SUSPENSION THEREFOR
Filed Sept. 8, 1928   3 Sheets-Sheet 3
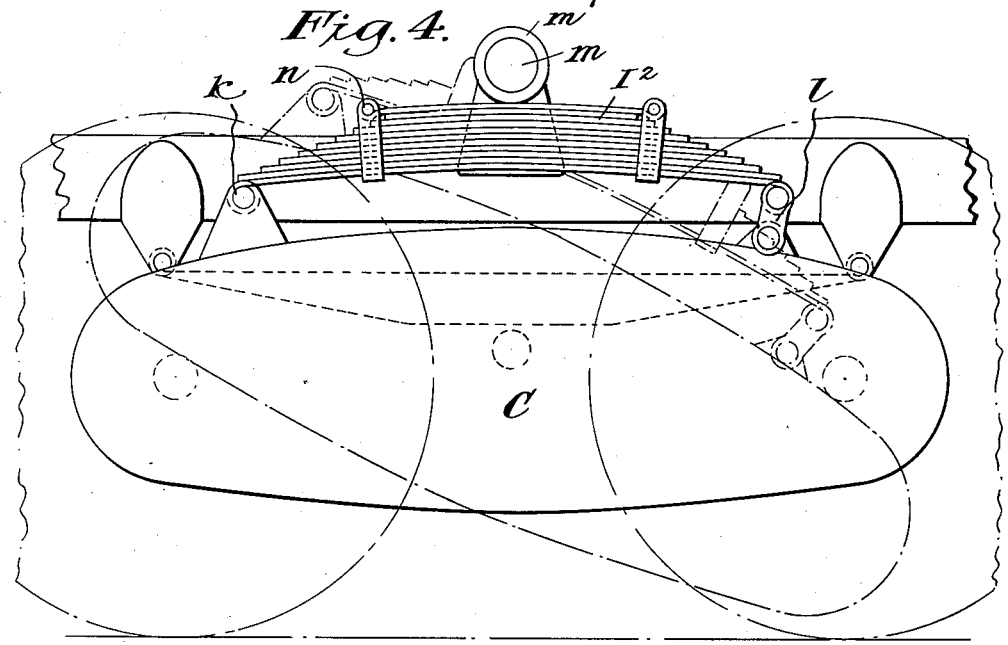
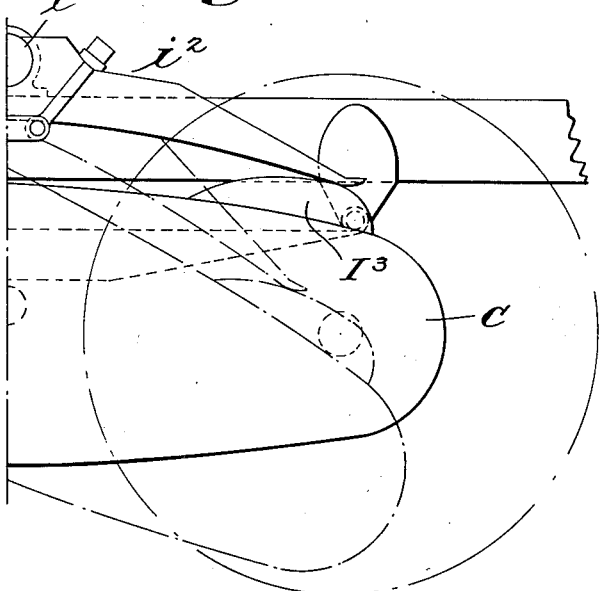
Inventor:
Gabriel Midboe
By his Attorneys:
Redding, Greeley, O'Shea & Campbell Patented Nov. 3, 1931

1,830,400

UNITED STATES PATENT OFFICE

GABRIEL MIDBOE, OF BROOKLYN, NEW YORK, ASSIGNOR TO INTERNATIONAL MOTOR COMPANY, OF NEW YORK, N. Y., A CORPORATION OF DELAWARE

INCLOSED CHAIN DRIVE AND SUSPENSION THEREFOR

Application filed September 8, 1928. Serial No. 304,800.

The present invention relates to driving mechanisms for vehicles which embody a plurality of driving wheels at each side and at one end of the frame. In the copending application of Alfred F. Masury, Serial No. 300,167 filed August 17, 1928, now Patent No. 1,741,425, dated Dec. 31, 1929, for driving mechanism for six wheel vehicle, a form of drive similar to the present invention is described, the structure embodied in the present application being an improved form of the drive shown in the foregoing application.

An object of the present invention is to provide a wheel mounting and driving mechanism which is highly flexible and capable of traveling over extremely rough roads, at the same time being strong and sufficiently rugged to resist the extreme forces incident to transmitting the drive from the jack shafts to the plurality of driving wheels which may assume many irregular positions with respect to each other.

A further object of the invention is to provide a construction of the above character which may be assembled and dismounted with ease, the number of parts being greatly reduced and constructed to facilitate such operations.

A further object of the invention is to provide an additional spring which is mounted upon the vehicle frame directly above the housing which incloses the chain drive, the drive extending between the driving sprockets mounted upon the jack shaft and the driven sprockets carried by the stub axles journaled in either end of the housing to mount the wheels. By providing a spring directly over the housing, the main spring which mounts the axle is relieved of the severe stresses incident to the twisting and turning of the housing with respect to the frame.

In accordance with the invention the second spring is so mounted with respect to the frame and to the housing that the housing can rock angularly with respect to the frame while resisted yieldingly in the most effective manner by the spring leaves. In one embodiment such spring is pivoted at its center to the frame and has its end slidably engaged with the housing. In another embodiment this condition is reversed, the spring having its ends pivoted to the housing and its center slidable with respect to the frame.

The invention will be understood more fully in connection with the accompanying drawings wherein:

Figure 1 is a view in elevation, with the outer wheels removed and showing the housing and auxiliary spring mounting.

Figure 2 is an end view, partly in section, showing the wheel mounting and spring suspension of Figure 1.

Figure 4 is a view somewhat diagrammatic in side elevation showing a spring pivoted at its ends to the rocking housing and slidably engaged at its center with the frame.

Figure 5 is a fragmentary view also diagrammatic and in side elevation showing a spring mounted like that shown in Figure 1 but with its ends slidably engaged with curved bearing blocks on the housing.

Figure 3:
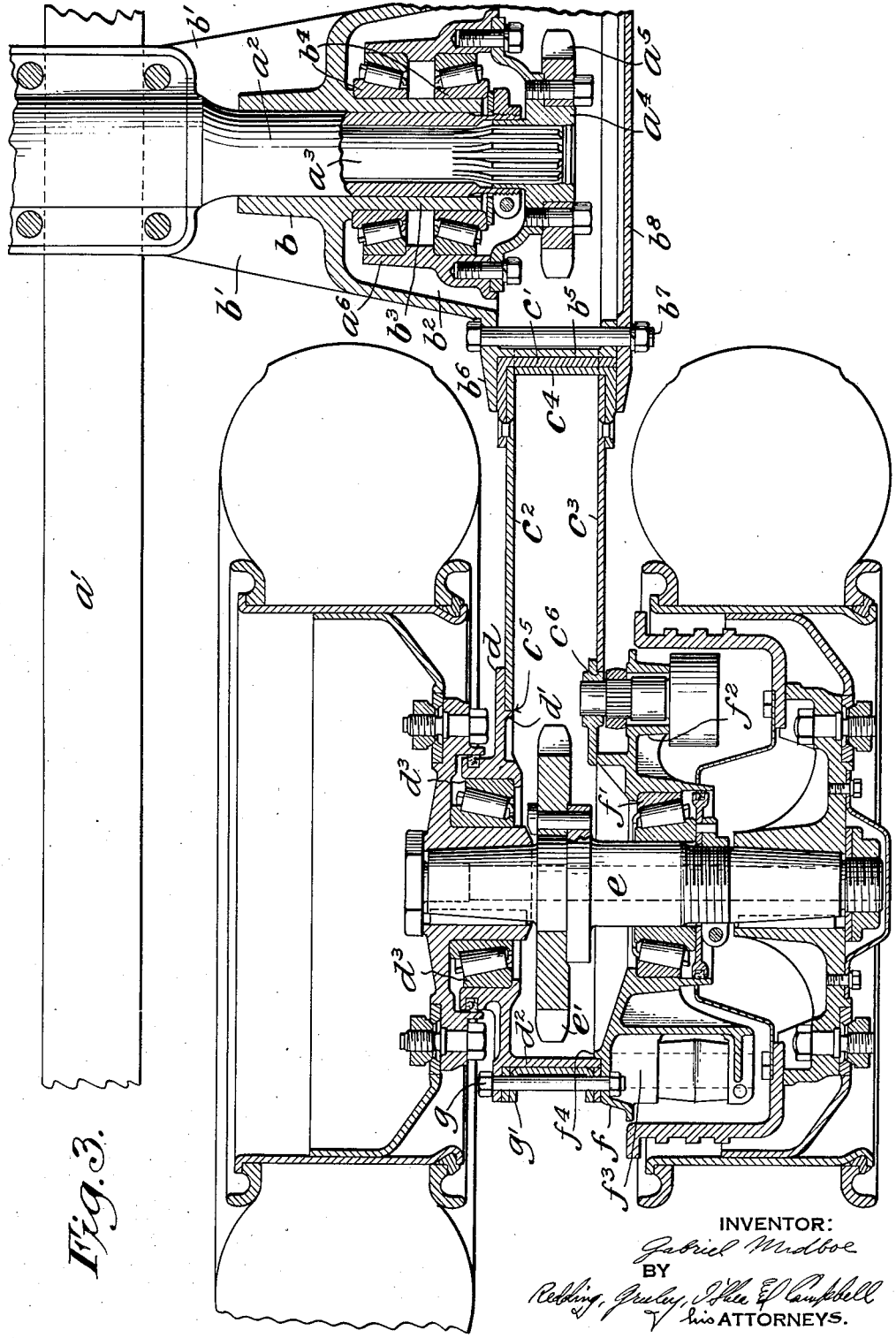
Figure 3 is a view in section, taken on line 3—3 of Figure 1 and looking in the direction of the arrows.

Referring to the above drawings, $a$ designates a vehicle frame provided with a main spring $a'$ which mounts the rear axle $a^2$. This axle houses a jack shaft $a^3$ which carries a flanged extension $a^4$ upon which is mounted a driving sprocket $a^5$. Secured to the flanged extension is a cylindrical bearing housing $a^6$. Over the axle, a bracket $b$ is mounted, the bracket being provided with webbed extensions $b^1$ which extend inwardly and are secured to the spring under the bolts which secure the axle thereto. The bracket is formed with a recess, or housing $b^2$ and an inwardly extending sleeve portion $b^3$ upon which bearing races $b^4$ are mounted. In this manner, the cylindrical bearing housing $a^6$ is journaled upon the bracket, and the sprocket $a^5$ rendered capable of receiving the driving reactions. The bracket is provided with a cylindrical bearing surface $b^5$ and a radial flange $b^6$. Bolts $b^7$ clamp a face plate $b^8$ to the bracket, the face plate being of a diameter approximately equal to the diameter of the radial flange $b^6$ in order that an annular groove may be formed, the bottom of which comprises the cylindrical surface $b^5$. Within this groove, a housing $c$ is pivotally received, the housing being provided with a cooperating bearing surface $c'$, as described hereinafter. The housing is formed of inner and outer plates $c^2$ and $c^3$, respectively, which are sufficiently thick to impart sufficient strength to resist stresses and strains incident to the operation of the vehicle. These plates are formed with centrally disposed coaxial apertures about which are mounted telescoping flanges $c'$ and $c^4$. The flange $c'$ is riveted to the inner plate $c^2$ and forms a bearing surface as described above. The flange $c^4$ is riveted to the outer plate $c^3$ and serves as a spacing member between the inner and outer plates.

Adjacent either end of the housing $c$, the inner and outer plates are formed with apertures $c^5$ and $c^6$, respectively. A closure $d$ is provided with a circumferential shoulder $d'$ to engage the aperture $c^5$ of the inner plate. This shoulder, at the end of the housing, lengthens into a spacing member $d^2$ for spacing the plates apart and strengthening the structure. A bearing $d^3$ is formed in the closure $d$ and serves to support one end of a stub axle $e$ upon which a driven sprocket $e'$ is mounted.

For the aperture in the outer plate, a closure $f$ is provided, this closure being formed with a bearing $f'$ supporting the stub shaft $e$, and also with extensions $f^2$ and $f^3$ upon which the brake mechanism is mounted. The closure $f$ is formed with a circumferential shoulder $f^4$ for engaging the aperture in the outer face plate $c^3$ and bolts $g$ pass through the closures and face plates to secure the elements together. A U-shaped peripheral channel $g'$ extends completely around the housing and serves as a spacing member for the face plates as well as a closure for the housing. It is evident that the flange $d^2$ can only extend completely across the housing at the end thereof, since, at the other side of the sprocket, the housing must be clear to permit the chain to pass between the driving and driven sprockets. The flanges $c'$ and $c^4$, as well as the bearing $b^5$, are apertured to permit the chain to pass between the sprockets as indicated in Figure 1. Idler sprockets $h$ may be mounted in the housing to take up the slack in the chain and permit a degree of movement of one wheel with respect to the other.

Secured to the frame $a$ of the vehicle at either side thereof are brackets $i$ which carry anchor tubes $i'$. These anchor tubes extend outwardly and mount springs $i^2$ which lie in the planes of the housing $c$. The ends of the springs engage bearing surfaces $i^3$ which are formed on the housings, thus affording an auxiliary spring suspension for applying the load and housing reactions directly to the frame through the springs at points adjacent the ends of the housings. This results in relieving the main spring $a'$ from the severe stresses incident to the twisting and turning of the housings $c$ during driving and affords a stronger construction.

In Figure 4 the spring $I^2$ has its front end pivotally engaged with the housing C as indicated at $k$. Its rear end is shackled to the housing by a shackle link $l$. On the frame and transversely thereof is a cross tube $m$ on which may be mounted an anti-friction bearing element such as a roller $m'$ with which the top of the spring is in slidable engagement. When the housing rocks the leaf springs are tensioned but the spring itself can move with respect to the tube $m$ so as not to be improperly strained. This angular movement of the spring about the tube $m$ may continue freely until the spring clip $n$ engages the roller $m$ as indicated in dotted lines in Figure 4.

In Figure 5 the spring shown conventionally at $i^2$ is pivoted to the frame at $i'$ and its free ends rest on bearing blocks on the housing $c$, one of these blocks being shown at $I^3$. This bearing block is of such configuration that when the housing rocks it will have something of a camming action on the end of the spring. The high point of the cam will be presented to the spring as the tension increases on the leaves and the spring will engage the low portion of the cam as the tension is relieved.

It will be apparent that the specific features described above may be rearranged and redesigned in many different ways and the invention is not to be limited save as defined in the appended claims.

I claim as my invention:

1. An improved mounting and drive for a plurality of wheels at one side of a vehicle comprising a housing, an axle, a bracket mounted on the axle, means to house driving sprockets in the bracket, means for securing the bracket and axle to a spring, a circumferential flange formed on the bracket, a bearing cooperating with the flange, a face plate removably secured to the bracket to cooperate with the flange and bearing, a second housing, driving wheels mounted at the ends of said second housing, and means to journal said second housing in the bearing.

2. An improved mounting and drive for a plurality of wheels at one side of a vehicle comprising a housing, an axle, means to support the housing pivotally on the axle, a spring mounting the axle upon the frame, a second spring, and means to mount the second spring independently of the first spring between the frame and housing.

3. An improved mounting and drive for a plurality of wheels at one side of a vehicle comprising a housing, an axle, means to support the housing pivotally on the axle, a spring mounting the axle upon the frame, a second spring, means to engage the second spring with the frame at its center, and means to engage the ends of the second spring with the housing.

4. An improved mounting and drive for a plurality of wheels at one side of a vehicle comprising a housing, an axle, means to support the housing pivotally on the axle, a spring mounting the axle upon the frame, a second spring, means to engage the second spring pivotally with the frame at its center and means to engage the ends of the second spring with the housing.

This specification signed this 6th day of September, A. D. 1928.

GABRIEL MIDBOE.